United States Patent [19]

Schwarz et al.

[11] Patent Number: 5,196,262

[45] Date of Patent: Mar. 23, 1993

[54] MICROPOROUS MATERIAL

[75] Inventors: Richard A. Schwarz, Akron; William Keim, Barberton, both of Ohio

[73] Assignee: PPG Industries, Inc., Pittsburgh, Pa.

[21] Appl. No.: 596,175

[22] Filed: Oct. 10, 1990

[51] Int. Cl.⁵ .......................... B32B 3/26; B32B 5/16
[52] U.S. Cl. .............................. 428/315.5; 428/318.4; 428/319.7; 428/319.9; 428/331; 428/517; 428/521; 428/328; 428/516
[58] Field of Search ....................... 428/331, 315.5, 402, 428/318.4, 319.7, 319.9, 517, 521, 328

[56] References Cited

U.S. PATENT DOCUMENTS

| | | | |
|---|---|---|---|
| 2,657,149 | 10/1983 | Iler | 106/308 |
| 2,940,830 | 6/1960 | Thornhill | 23/182 |
| 3,351,495 | 11/1967 | Larsen et al. | 136/146 |
| 4,237,083 | 12/1980 | Young et al. | 264/41 |
| 4,681,750 | 7/1987 | Johnson et al. | 423/339 |
| 4,778,601 | 10/1988 | Lopatin et al. | 210/500.27 |
| 4,833,172 | 5/1989 | Schwarz et al. | 524/62 |
| 4,861,644 | 8/1989 | Young et al. | 428/195 |
| 4,892,779 | 1/1990 | Leatherman et al. | 428/220 |
| 4,937,115 | 6/1990 | Leatherman | 428/36.4 |
| 5,032,450 | 7/1991 | Rechlicz et al. | 428/196 |

FOREIGN PATENT DOCUMENTS

| | | |
|---|---|---|
| 0322169 | 6/1989 | European Pat. Off. . |
| 2-67389 | 3/1990 | Japan . |
| 1044028 | 9/1966 | United Kingdom . |
| 1044502 | 10/1966 | United Kingdom . |
| 1044503 | 10/1966 | United Kingdom . |

OTHER PUBLICATIONS

D. H. Fishman, "Evaluating Film Properties Improves Quality Control", *Paper, Film & Foil Converter*, Jul. 1990, pp. 45–46.

H. Ueda et al, "Characterization of Mixtures of Linear Polyethylenes of Ultrahigh and Moderate Molecular Weights", *Polymer Engineering and Science*, vol. 26, No. 21, Nov. 1986, pp. 1483–1488.

*Primary Examiner*—P. C. Sluby
*Assistant Examiner*—Hoa T. Lê
*Attorney, Agent, or Firm*—George D. Morris

[57] ABSTRACT

Microporous material comprises: (1) a matrix comprising a mixture of substantially linear ultrahigh molecular weight polyethylene having an intrinsic viscosity of at least about 10 deciliters/gram and lower molecular weight polyethylene having an ASTM D 1238-86 Condition E melt index of less than about 50 grams/10 minutes and an ASTM D 1238-86 Condition F melt index of at least 0.1 gram/10 minutes, (2) a large proportion of finely divided water-insoluble siliceous filler, and (3) interconnecting pores wherein the weight percent of the ultrahigh molecular weight polyethylene in the total polyethylene of the matrix and the filler/matrix weight ratio are within the polygon ABCDEF of FIG. 6 of the drawings.

45 Claims, 6 Drawing Sheets

MICROPOROUS MATERIAL

BACKGROUND OF THE INVENTION

U.S. Pat. No. 4,861,644 describes printing upon microporous materials which comprise (1) matrices comprising large proportions of ultrahigh molecular weight (UHMW) polyolefin, (2) large proportions of siliceous filler distributed throughout the matrices, and (3) interconnecting pores. Such microporous materials accept inks well and the inks set very quickly which is especially important for high speed multipress printing runs. The printed microporous materials are durable and substantially waterproof.

It has been noticed that sometimes during the multipress printing of these microporous materials, problems with registration of the images have occurred. Although it is desired not to be bound by any theory, it is believed that the misregistrations are principally due to deformations of the microporous sheets during printing. Such deformations are believed to be the result of applied stresses such as various compressions and/or tensions occurring during movement of the microporous material through the presses.

In the context of converting polymer films, D. H. Fishman, *Paper, Film & Foil Converter*, July 1990, pages 45-46, indicates that the maximum stretching that can be tolerated in a film and still hold register has been determined to be 0.63%. Irrespective of the precise value, it is clear that in the case of microporous materials elongations resulting from applied stresses in printing presses should be low.

Insofar as microporous materials are concerned, the prior art has been primarily concerned with physical properties at or near the break point. The elongations at these points are usually high, and the physical properties so determined usually provide little or no information as to the magnitude of applied stresses at small elongations. Although two materials may have the same ultimate tensile strengths or the same tensile strengths at break, the paths on the stress vs. strain diagram leading to these values may be markedly different.

Good registration during printing is a result of high dimensional stability of the microporous sheet. A major element of high dimensional stability is low elongation. Therefore, it is desirable to use microporous materials which are resistant to strain at low stress. Restated, it is desirable that the slope of the curve on the stress vs. strain diagram to be very steep at low stresses.

SUMMARY OF THE INVENTION

It has now been found that by employing proper proportions of substantially linear high molecular weight polyethylene, lower molecular weight polyethylene, and particulate filler, microporous materials can be produced which exhibit high tensile strengths at low elongations. Accordingly, in microporous material which on a coating-free, printing ink-free, impregnant-free, and pre-bonding basis comprises: (a) a matrix comprising a mixture of substantially linear ultrahigh molecular weight polyethylene having an intrinsic viscosity of at least about 10 deciliters/gram and lower molecular weight polyethylene having an ASTM D 1238-86 Condition E melt index of less than about 50 grams/10 minutes and an ASTM D 1238-86 Condition F melt index of at least 0.1 gram/10 minutes; (b) finely divided substantially water-insoluble filler particles, of which at least about 50 percent by weight are siliceous particles, the filler particles being distributed throughout the matrix; and (c) a network of interconnecting pores communicating substantially throughout the microporous material, the pores constituting from about 35 to about 80 percent by volume of the microporous material; the invention is the improvement wherein the weight percent of the ultrahigh molecular weight polyethylene in the total polyethylene of the matrix and the filler/matrix weight ratio are within the polygon ABCDEF of FIG. 6 of the drawings. In many instances the weight percent of the ultrahigh molecular weight polyethylene in the total polyethylene of the matrix and the filler/matrix weight ratio are within the polygon GHCI of FIG. 6 of the drawings. Preferably the weight percent of the ultrahigh molecular weight polyethylene in the total polyethylene of the matrix and the filler/matrix weight ratio are within the polygon JHCK of FIG. 6 of the drawings.

BRIEF DESCRIPTION OF THE DRAWINGS

For a better understanding of the invention, reference may be made to the drawings in which.

DETAILED DESCRIPTION OF THE INVENTION

Figure 1:
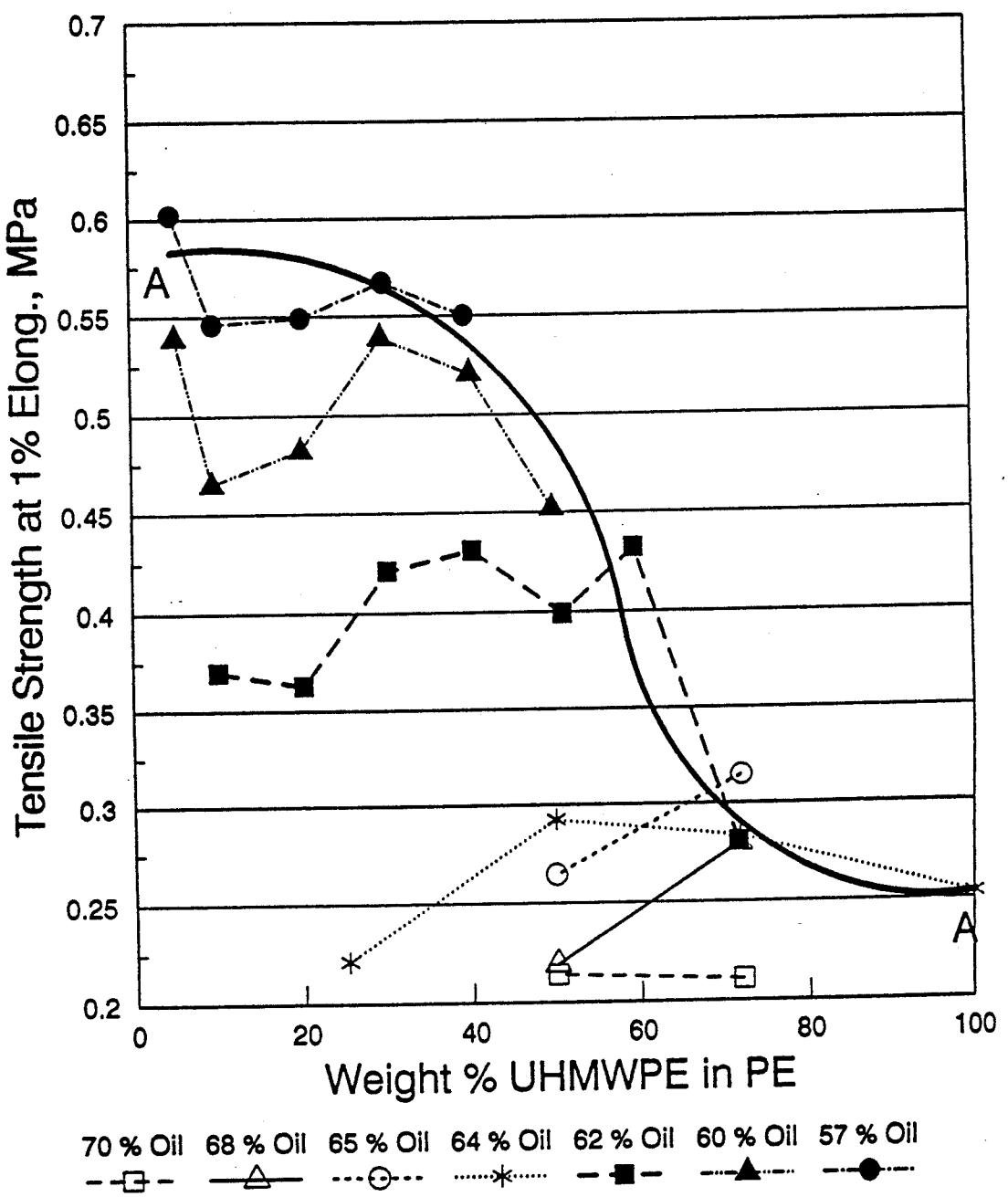
FIGS. 1-5 show graphically data from Table 2, below.

Inasmuch as ultrahigh molecular weight polyethylene (UHMWPE) is not a thermoset polymer having an infinite molecular weight, it is technically classified as a thermoplastic. However, because the molecules are substantially very long chains, UHMWPE softens when heated but does not flow as a molten liquid in a normal thermoplastic manner. The very long chains and the peculiar properties they provide to UHMWPE are believed to contribute in large measure to the desirable properties of microporous materials made using this polymer.

As indicated earlier, the intrinsic viscosity of the UHMWPE is at least about 10 deciliters/gram. Usually the intrinsic viscosity is at least about 14 deciliters/gram. Often the intrinsic viscosity is at least about 18 deciliters/gram. In many cases the intrinsic viscosity is at least about 19 deciliters/gram. Although there is no particular restriction on the upper limit of the intrinsic viscosity, the intrinsic viscosity is frequently in the range of from about 10 to about 39 deciliters/gram. The intrinsic viscosity is often in the range of from about 14 to about 39 deciliters/gram. In most cases the intrinsic viscosity is in the range of from about 18 to about 39 deciliters/gram. An intrinsic viscosity in the range of from about 18 to about 32 deciliters/gram is preferred.

The nominal molecular weight of UHMWPE is empirically related to the intrinsic viscosity of the polymer according to the equation:

$$M = 5.37 \times 10^4 [\eta]^{1.37}$$

where M is the nominal molecular weight and $[\eta]$ is the intrinsic viscosity of the UHMWPE expressed in deciliters/gram.

As used herein and in the claims, intrinsic viscosity is determined by extrapolating to zero concentration the reduced viscosities or the inherent viscosities of several dilute solutions of the UHMWPE where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMWPE are ascertained from relative viscosities obtained at 135° C. using an Ubbelohde No. 1 viscometer in accordance with the general procedures of ASTM D 4020-81, except that several dilute solutions of differing concentration are employed. ASTM D 4020-81 is, in its entirety, incorporated herein by reference.

The nominal molecular weight of the lower molecular weight polyethylene (LMWPE) is lower than that of the UHMWPE. LMWPE is thermoplastic and many different types are known. One method of classification is by density, expressed in grams/cubic centimeter and rounded to the nearest thousandth, in accordance with ASTM D 1248-84 (Reapproved 1989):

TABLE 1

| Type | Abbreviation | Density, g/cm$^3$ |
|---|---|---|
| Low Density Polyethylene | LDPE | 0.910–0.925 |
| Medium Density Polyethylene | MDPE | 0.926–0.940 |
| High Density Polyethylene | HDPE | 0.941–0.965 |

Any or all of these polyethylenes may be used as the LMWPE in the present invention. HDPE, however, is preferred because it ordinarily tends to be more linear than MDPE or LDPE. ASTM D 1248-84 (Reapproved 1989) is, in its entirety, incorporated herein by reference.

Processes for making the various LMWPE's are well known and well documented. They include the high pressure process, the Phillips Petroleum Company process, the Standard Oil Company (Indiana) process, and the Ziegler process.

The ASTM D 1238-86 Condition E (that is, 190° C. and 2.16 kilogram load) melt index of the LMWPE is less than about 50 grams/10 minutes. Often the Condition E melt index is less than about 25 grams/10 minutes. Preferably the Condition E melt index is less than about 15 grams/10 minutes.

The ASTM D 1238-86 Condition F (that is, 190° C. and 21.6 kilogram load) melt index of the LMWPE is at least 0.1 gram/10 minutes. In many cases the Condition F melt index is at least about 0.5 gram/10 minutes. Preferably the Condition F melt index is at least about 1.0 gram/10 minutes.

ASTM D 1238-86 is, in its entirety, incorporated herein by reference.

Sufficient UHMWPE and LMWPE should be present in the matrix to provide their properties to the microporous material. Other thermoplastic organic polymer may also be present in the matrix so long as its presence does not materially affect the properties of the microporous material in an adverse manner. The other thermoplastic polymer may be one other thermoplastic polymer or it may be more than one other thermoplastic polymer. The amount of the other thermoplastic polymer which may be present depends upon the nature of such polymer. Examples of thermoplastic organic polymers which may optionally be present include poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers may be neutralized with sodium, zinc, or the like. In most cases the UHMWPE and the LMWPE together constitute at least about 65 percent by weight of the polymer of the matrix. Often the UHMWPE and the LMWPE together constitute at least about 85 percent by weight of the polymer of the matrix. Preferably the other thermoplastic organic polymer is substantially absent so that the UHMWPE and the LMWPE together constitute substantially 100 percent by weight of the polymer of the matrix.

As present in the microporous material, the finely divided substantially water-insoluble siliceous particles may be in the form of ultimate particles, aggregates of ultimate particles, or a combination of both. In most cases, at least about 90 percent by weight of the siliceous particles used in preparing the microporous material have gross particle sizes in the range of from about 5 to about 40 micrometers as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Preferably at least about 90 percent by weight of the siliceous particles have gross particle sizes in the range of from about 10 to about 30 micrometers. It is expected that the sizes of filler agglomerates may be reduced during processing of the ingredients to prepare the microporous material. Accordingly, the distribution of gross particle sizes in the microporous material may be smaller than in the raw siliceous filler itself. ASTM C 690-80 is, in its entirety, incorporated herein by reference.

Examples of suitable siliceous particles include particles of silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. Silica and the clays are the preferred siliceous particles. Of the silicas, precipitated silica, silica gel, or fumed silica is most often used.

In addition to the siliceous particles, finely divided substantially water-insoluble non-siliceous filler particles may also be employed. Examples of such optional non-siliceous filler particles include particles of titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided substantially water-insoluble flame retardant filler particles such as particles of ethylenebis(tetra-bromophthalimide), octabromodiphenyl oxide, decabromodiphenyl oxide, and ethylenebisdibromonorbornane dicarboximide.

As present in the microporous material, the finely divided substantially water-insoluble non-siliceous filler particles may be in the form of ultimate particles, aggregates of ultimate particles, or a combination of both. In most cases, at least about 75 percent by weight of the non-siliceous filler particles used in preparing the microporous material have gross particle sizes in the range of from about 0.1 to about 40 micrometers as determined by use of a Micromeretics Sedigraph 5000-D (Micromeretics Instrument Corp.) in accordance with the accompanying operating manual. The preferred ranges vary from filler to filler. For example, it is preferred that at least about 75 percent by weight of antimony oxide particles be in the range of from about 0.1 to about 3 micrometers, whereas it is preferred that at least about 75 percent by weight of barium sulfate particles be in the range of from about 1 to about 25 micrometers. It is expected that the sizes of filler agglomerates may be reduced during processing of the ingredients to prepare the microporous material. Therefore, the distribution of gross particle sizes in the microporous material may be smaller than in the raw non-siliceous filler itself.

The particularly preferred finely divided substantially water-insoluble siliceous filler particles are precipitated silica. Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144, the entire disclosure of which is incorporate herein by reference. Note especially pages 15-29, 172-176, 218-233, 364-365, 462-465, 554-564, and 578-579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used in the present invention.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Many different precipitated silicas may be employed in the present invention, but the preferred precipitated silicas are those obtained by precipitation from an aqueous solution of sodium silicate using a suitable acid such as sulfuric acid, hydrochloric acid, or carbon dioxide. Such precipitated silicas are themselves known and processes for producing them are described in detail in U.S. Pat. Nos. 2,657,149; 2,940,830; and 4,681,750, the entire disclosures of which are incorporated herein by reference, including especially the processes for making precipitated silicas and the properties of the products.

In the case of the preferred filler, precipitated silica, the average ultimate particle size (irrespective of whether or not the ultimate particles are agglomerated) is less than about 0.1 micrometer as determined by transmission electron microscopy. Often the average ultimate particle size is less than about 0.05 micrometer. Preferably the average ultimate particle size of the precipitated silica is less than about 0.03 micrometer.

At least about 50 percent by weight of the finely divided substantially water-insoluble filler particles are finely divided substantially water-insoluble siliceous filler particles. In many cases at least about 65 percent by weight of the finely divided substantially water-insoluble filler particles are siliceous. Often at least about 75 percent by weight of the finely divided substantially water-insoluble filler particles are siliceous. Frequently at least about 85 percent by weight of the finely divided substantially water-insoluble filler particles are siliceous. In many instances all of the finely divided substantially water-insoluble filler particles are siliceous.

Minor amounts, usually less than about 5 percent by weight, of other materials used in processing such as lubricant, processing plasticizer, organic extraction liquid, surfactant, water, and the like, may optionally also be present. Yet other materials introduced for particular purposes may optionally be present in the microporous material in small amounts, usually less than about 15 percent by weight. Examples of such materials include antioxidants, ultraviolet light absorbers, reinforcing fibers such as chopped glass fiber strand, dyes, pigments, and the like. The balance of the microporous material, exclusive of filler and any coating, printing ink, or impregnant applied for one or more special purposes is essentially the thermoplastic organic polymer.

On a coating-free, printing ink free, impregnant-free, and pre-bonding basis, pores constitute at least about 35 percent by volume of the microporous material. In many instances the pores constitute at least about 60 percent by volume of the microporous material. Often the pores constitute from at least about 35 percent to about 80 percent by volume of the microporous material. From about 60 percent to about 75 percent by volume is preferred. As used herein and in the claims, the porosity (also known as void volume) of the microporous material, expressed as percent by volume, is determined according to the equation:

$$\text{Porosity} = 100[1 - d_1/d_2]$$

where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material is determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left(\frac{v_1 r_1}{w_1} + \frac{v_2 r_2}{w_2}\right) / \left(\frac{v_1}{w_1} + \frac{v_2}{w_2}\right)$$

where d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. Generally on a coating-free, printing ink-free, impregnant-free, and pre-bonding basis the volume average diameter of the pores is in the range of from about 0.02 to about 0.5 micrometer. Very often the volume average diameter of the pores is in the range of from about 0.04 to about 0.3 micrometer. From about 0.05 to about 0.25 micrometer is preferred.

In the course of determining the volume average pore diameter by the above procedure, the maximum pore radius detected is sometimes noted. This is taken from the low pressure range scan if run; otherwise it is taken from the high pressure range scan. The maximum pore diameter is twice the maximum pore radius.

Inasmuch as some coating processes, printing processes, impregnation processes and bonding processes result in filling at least some of the pores of the microporous material and since some of these processes irreversibly compress the microporous material, the parameters in respect of porosity, volume average diameter of the pores, and maximum pore diameter are determined for the microporous material prior to application of one or more of these processes.

Preferably filler particles, thermoplastic organic polymer powders, processing plasticizer and minor amounts of lubricant and antioxidant are mixed until a substantially uniform mixture is obtained. The weight ratio of filler to polymer powder employed in forming the mixture is essentially the same as that of the microporous material to be produced. The mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die. The continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is microporous material, is passed to a take-up roll.

The processing plasticizer has little solvating effect on the thermoplastic organic polymer at 60° C., only a moderate solvating effect at elevated temperatures on the order of about 100° C., and a significant solvating effect at elevated temperatures on the order of about 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are oils which have a pour point of less than 22° C. according to ASTM D 97-66 (reapproved 1978). Particularly preferred are oils having a pour point of less than 10° C. Examples of suitable oils include Shellflex® 412 and Shellflex® 371 oil (Shell Oil Co.) which are solvent refined and hydrotreated oils derived from naphthenic crude. Further examples of suitable oils include ARCOprime® 400 oil (Atlantic Richfield Co.) and Kaydol® oil (Witco Corp.) which are white mineral oils. ASTM D 2226-82 and ASTM D 97-66 (reapproved 1978) are, in their entireties, incorporated herein by reference. It is expected that other materials, including the p'ıthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

In the above described process for producing microporous material, extrusion and calendering are facilitated when the substantially water-insoluble filler particles carry much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of at least the siliceous filler particles is in the range of from about 20 to about 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from about 25 to 350 square meters per gram. ASTM C 819-77 is, in its entirety, incorporated herein by reference. Preferably, but not necessarily, the surface area of any non-siliceous filler particles used is also in at least one of these ranges.

Inasmuch as it is desirable to essentially retain the filler in the microporous material, it is preferred that the substantially water-insoluble filler particles be substantially insoluble in the processing plasticizer and substantially insoluble in the organic extraction liquid when microporous material is produced by the above process.

The residual processing plasticizer content is usually less than 10 percent by weight of the microporous sheet and this may be reduced even further by additional extractions using the same or a different organic extraction liquid. Often the residual processing plasticizer content is less than 5 percent by weight of the microporous sheet and this may be reduced even further by additional extractions.

It has been found that by increasing the relative proportion of LMWPE in the matrix, higher tensile strengths at low (e.g., 1%) elongations may be achieved. It has also been found that some UHMWPE is nevertheless necessary in order to form the microporous material by the process described above. More specifically, the total replacement of UHMWPE by LMWPE results in a mixture that does not have a hot strength adequate for processing in the manner described above. Although it is not desired to be bound by any theory, it is believed that UHMWPE molecules confer thermoplastic properties on the mixture at processing temperatures.

It has also been found that the weight ratio of the filler to the matrix is also an important parameter in providing high tensile strengths at low elongations. In addition it has been found that when the polyethylene component weight ratio and the weight ratio of the filler to the matrix are both held constant, varying the amount of processing plasticizer causes variation of the tensile strength at low elongations.

Comparative experiments have shown that the tensile strengths and many other tensile properties of microporous materials from which the processing plasticizer has been substantially removed are substantially the same as those of the corresponding microporous materials from which the processing plasticizer has not been removed. Although it is not desired to be bound by any theory, it is believed that during cooling following calendering the precipitation of the organic polymer from the processing plasticizer is substantially complete so that: (1) the composition of the matrix is substantially the same before extraction as it is after, and (2) presence of the processing plasticizer in the pores does not materially affect the tensile properties of the matrix. This discovery is important since it means that tensile strengths and many other tensile properties of formulations mixed in small batches and sheeted out using laboratory-sized rubber mills can reliably be used to predict the results of changing formulations and/or conditions on the much larger production lines where the processing plasticizer is substantially removed and where making experimental formulation changes is especially cumbersome due to the large amounts of materials and time involved.

The invention is further described in conjunction with the following examples which are to be considered illustrative rather than limiting, and in which all parts are parts by weight and all percentages are percentages by weight unless otherwise specified.

EXAMPLES 1—110

Laboratory samples were prepared by mixing together the ingredients listed in Table 2. Numbers in parentheses refer to the footnotes which appear at the end of Table 2. All solids were weighed into a glass beaker and then the indicated amount of processing oil was added. The materials were blended with a spatula to form a paste. The paste was preheated to 105° C. in an air oven for from 30 to 90 minutes.

Sheet samples were prepared on a C. W. Brabender Prep Mill, Type PM-3000, two-roll laboratory mill using 170° C. roll temperature, a 0.96 millimeter gap, and a drive speed of 20 revolutions per minute. The warmed paste was added to the nip of the mill. For the mixtures of some examples a slower drive speed was used initially to facilitate early mixing of the ingredients. The polyethylenes were allowed to melt and the mixture was consolidated to a uniform sheet with a rolling bank. The sample was mixed by making cuts from one side to one-half to three-quarters across the sheet and folding the trailing flap back onto the uncut portion. Further cuts were made alternating from the edge from which the initial cut was made and the trailing flap was folded back onto the uncut portion. After the sample was mixed, the mill speed was slowed to 10 revolutions per minute and allowed to run for a short while in order to minimize any orientation effects caused by the mill. The slow speed also aided in removing the sheet from the mill. The mill was stopped. The sheet on the mill roll was cut near the nip entrance, a 2 to 3 centimeter flap was loosened from the roll and held on a piece of paper towel. The mill was restarted and the sheet was removed as one continuous piece. The sheet sample was placed on a stainless steel covered stone bench top to cool.

Tensile specimens were cut from the cooled samples and tested according to ASTM D 828-60 (Reapproved 1971), except that samples 25.4 millimeters wide were tested at 25.4 millimeters per minute using an initial jaw separation of 25.4 millimeters. Tensile strengths were measured at 1% elongation. Specimens were cut so that tensile strengths were measured in both the machine direction (MD) and the cross-machine direction (CD) for each sample. The tensile strengths reported in Table 2 are averages of the MD and CD tensile strengths so obtained. ASTM D 828-60 (Reapproved 1971) is incorporated herein in its entirety.

TABLE 2

Formulations and Test Results

| Example | 1 | 2 | 3 | 4 | 5 | 6 | 7 | 8 | 9 | 10 |
|---|---|---|---|---|---|---|---|---|---|---|
| Ingredient | | | | | | | | | | |
| UHMWPE (1), g | 5.80 | 6.50 | 4.75 | 10.30 | 11.40 | 6.20 | 6.60 | 7.20 | 7.40 | 7.80 |
| HDPE (2), g | 2.30 | 2.60 | 4.75 | 0.00 | 0.00 | 2.40 | 2.60 | 2.80 | 2.90 | 3.10 |
| Precipitated Silica (3), g | 28.00 | 27.00 | 28.50 | 25.80 | 28.60 | 21.40 | 22.80 | 25.00 | 25.80 | 27.10 |
| Antioxidant (4), g | 0.04 | 0.04 | 0.05 | 0.05 | 0.05 | 0.05 | 0.05 | 0.05 | 0.05 | 0.05 |
| Lubricant (5), g | 0.24 | 0.27 | 0.30 | 0.30 | 0.30 | 0.30 | 0.30 | 0.30 | 0.30 | 0.30 |
| Processing Oil (6), g | 63.9 | 63.9 | 62.0 | 63.9 | 60.0 | 70.0 | 68.0 | 65.0 | 63.9 | 62.0 |
| Relative Proportions | | | | | | | | | | |

TABLE 2-continued

Formulations and Test Results

| | | | | | | | | | | |
|---|---|---|---|---|---|---|---|---|---|---|
| Filler/Matrix Weight Ratio | 3.46 | 2.97 | 3.00 | 2.50 | 2.51 | 2.49 | 2.48 | 2.50 | 2.50 | 2.49 |
| UHMWPE Content of PE (7), wt % | 71.6 | 71.4 | 50.0 | 100.0 | 100.0 | 72.1 | 71.7 | 72.0 | 71.8 | 71.6 |
| Oil Content, wt % | 64 | 64 | 62 | 64 | 60 | 70 | 68 | 65 | 64 | 62 |
| Test Results | | | | | | | | | | |
| Tensile Strength at 1% Elongation, MPa | 0.250 | 0.265 | 0.361 | 0.253 | (9) | 0.211 | 0.279 | 0.315 | 0.283 | 0.280 |

| Example | 11 | 12 | 13 | 14 | 15 | 16 | 17 | 18 | 19 | 20 |
|---|---|---|---|---|---|---|---|---|---|---|
| Ingredient | | | | | | | | | | |
| UHMWPE (1), g | 8.20 | 8.00 | 6.50 | 6.80 | 4.30 | 4.60 | 5.00 | 5.20 | 5.69 | 5.70 |
| HDPE (2), g | 3.20 | 3.40 | 4.40 | 4.60 | 4.30 | 4.60 | 5.00 | 5.20 | 5.44 | 5.70 |
| Precipitated Silica (3), g | 28.60 | 28.60 | 27.10 | 28.60 | 21.40 | 22.80 | 25.00 | 25.80 | 27.03 | 28.60 |
| Antioxidant (4), g | 0.05 | 0.05 | 0.05 | 0.05 | 0.05 | 0.05 | 0.05 | 0.05 | 0.05 | 0.05 |
| Lubricant (5), g | 0.30 | 0.30 | 0.30 | 0.30 | 0.30 | 0.30 | 0.30 | 0.30 | 0.30 | 0.30 |
| Processing Oil (6), g | 60.0 | 60.0 | 62.0 | 60.0 | 70.0 | 68.0 | 65.0 | 63.9 | 61.8 | 60.0 |
| Relative Proportions | | | | | | | | | | |
| Filler/Matrix Weight Ratio | 2.51 | 2.51 | 2.49 | 2.51 | 2.49 | 2.48 | 2.50 | 2.48 | 2.43 | 2.51 |
| UHMWPE Content of PE (7), wt % | 71.9 | 70.2 | 59.6 | 59.6 | 50.0 | 50.0 | 50.0 | 50.0 | 51.1 | 50.0 |
| Oil Content, wt % | 60 | 60 | 62 | 60 | 70 | 68 | 65 | 64 | 62 | 60 |
| Test Results | | | | | | | | | | |
| Tensile Strength at 1% Elongation, MPa | (9) | (9) | 0.432 | (9) | 0.214 | 0.219 | 0.264 | 0.292 | 0.399 | 0.452 |

| Example | 21 | 22 | 23 | 24 | 25 | 26 | 27 | 28 | 29 | 30 |
|---|---|---|---|---|---|---|---|---|---|---|
| Ingredient | | | | | | | | | | |
| UHMWPE (1), g | 4.40 | 4.60 | 4.90 | 3.30 | 3.40 | 3.70 | 2.60 | 2.20 | 2.30 | 2.50 |
| HDPE (2), g | 6.50 | 6.80 | 7.40 | 7.60 | 8.00 | 8.60 | 7.70 | 8.70 | 9.10 | 9.80 |
| Precipitated Silica (3), g | 27.10 | 28.60 | 30.70 | 27.10 | 28.60 | 30.70 | 25.80 | 27.10 | 28.60 | 30.70 |
| Antioxidant (4), g | 0.05 | 0.05 | 0.05 | 0.05 | 0.05 | 0.05 | 0.05 | 0.05 | 0.05 | 0.05 |
| Lubricant (5), g | 0.30 | 0.30 | 0.30 | 0.30 | 0.30 | 0.30 | 0.30 | 0.30 | 0.30 | 0.30 |
| Processing Oil (6), g | 62.0 | 60.0 | 57.0 | 62.0 | 60.0 | 57.0 | 63.9 | 62.0 | 60.0 | 57.0 |
| Relative Proportions | | | | | | | | | | |
| Filler/Matrix Weight Ratio | 2.49 | 2.51 | 2.50 | 2.49 | 2.51 | 2.50 | 2.50 | 2.49 | 2.51 | 2.50 |
| UHMWPE Content of PE (7), wt % | 40.4 | 40.4 | 39.8 | 30.3 | 29.8 | 30.1 | 25.2 | 20.2 | 20.2 | 20.3 |
| Oil Content, wt % | 62 | 60 | 57 | 62 | 60 | 57 | 64 | 62 | 60 | 57 |
| Test Results | | | | | | | | | | |
| Tensile Strength at 1% Elongation, MPa | 0.431 | 0.521 | 0.550 | 0.421 | 0.539 | 0.567 | 0.221 | 0.363 | 0.482 | 0.549 |

| Example | 31 | 32 | 33 | 34 | 35 | 36 | 37 | 38 | 39 | 40 |
|---|---|---|---|---|---|---|---|---|---|---|
| Ingredient | | | | | | | | | | |
| UHMWPE (1), g | 1.10 | 1.10 | 1.20 | 0.60 | 0.60 | 0.60 | 0.00 | 13.30 | 8.50 | 9.30 |
| HDPE (2), g | 9.80 | 10.30 | 11.10 | 10.30 | 10.80 | 11.70 | 10.30 | 0.00 | 3.40 | 4.00 |
| Precipitated Silica (3), g | 27.10 | 28.60 | 30.70 | 27.10 | 28.60 | 30.70 | 25.80 | 26.70 | 24.20 | 26.70 |
| Antioxidant (4), g | 0.05 | 0.05 | 0.05 | 0.05 | 0.05 | 0.05 | 0.05 | 0.05 | 0.06 | 0.05 |
| Lubricant (5), g | 0.30 | 0.30 | 0.30 | 0.30 | 0.30 | 0.30 | – 0.30 | 0.30 | 0.36 | 0.30 |
| Processing Oil (6), g | 62.0 | 60.0 | 57.0 | 62.0 | 60.0 | 57.0 | 63.9 | 60.0 | 63.9 | 60.0 |
| Relative Proportions | | | | | | | | | | |
| Filler/Matrix Weight Ratio | 2.49 | 2.51 | 2.50 | 2.49 | 2.51 | 2.50 | 2.50 | 2.01 | 2.03 | 2.01 |
| UHMWPE Content of PE (7), wt % | 10.1 | 9.6 | 9.8 | 5.5 | 5.3 | 4.9 | 0.0 | 100.0 | 71.4 | 69.9 |
| Oil Content, wt % | 62 | 60 | 57 | 62 | 60 | 57 | 64 | 60 | 64 | 60 |
| Test Results | | | | | | | | | | |
| Tensile Strength at 1% Elongation, MPa | 0.370 | 0.465 | 0.546 | (8) | 0.539 | 0.602 | (8) | (9) | 0.365 | 0.428 |

| Example | 41 | 42 | 43 | 44 | 45 | 46 | 47 | 48 | 49 | 50 |
|---|---|---|---|---|---|---|---|---|---|---|
| Ingredient | | | | | | | | | | |
| UHMWPE (1), g | 10.00 | 8.00 | 8.60 | 6.70 | 7.15 | 7.65 | 5.30 | 5.72 | 6.10 | 4.00 |
| HDPE (2), g | 4.30 | 5.30 | 5.70 | 6.70 | 7.15 | 7.65 | 8.00 | 8.58 | 9.20 | 9.30 |
| Precipitated Silica (3), g | 28.70 | 26.70 | 28.70 | 26.70 | 28.70 | 30.70 | 26.70 | 28.70 | 30.70 | 26.70 |
| Antioxidant (4), g | 0.06 | 0.05 | 0.05 | 0.05 | 0.06 | 0.05 | 0.05 | 0.06 | 0.05 | 0.05 |
| Lubricant (5), g | 0.36 | 0.30 | 0.30 | 0.30 | 0.36 | 0.30 | 0.30 | 0.36 | 0.30 | 0.30 |
| Processing Oil (6), g | 57.0 | 60.0 | 57.0 | 60.0 | 57.0 | 54.0 | 60.0 | 57.0 | 54.0 | 60.0 |
| Relative Proportions | | | | | | | | | | |
| Filler/Matrix Weight Ratio | 2.01 | 2.01 | 2.01 | 1.99 | 2.01 | 2.01 | 2.01 | 2.01 | 2.01 | 2.01 |
| UHMWPE Content of PE (7), wt % | 69.9 | 60.2 | 60.1 | 50.0 | 50.0 | 50.0 | 39.8 | 40.0 | 39.9 | 30.1 |
| Oil Content, wt % | 57 | 60 | 57 | 60 | 57 | 54 | 60 | 57 | 54 | 60 |
| Test Results | | | | | | | | | | |
| Tensile Strength at 1% Elongation, MPa | 0.504 | 0.494 | 0.510 | 0.486 | 0.534 | 0.599 | 0.606 | 0.569 | 0.598 | 0.610 |

| Example | 51 | 52 | 53 | 54 | 55 | 56 | 57 | 58 | 59 | 60 |
|---|---|---|---|---|---|---|---|---|---|---|

TABLE 2-continued
Formulations and Test Results

| Ingredient | | | | | | | | | | |
|---|---|---|---|---|---|---|---|---|---|---|
| UHMWPE (1), g | 4.29 | 4.60 | 2.70 | 2.86 | 3.10 | 1.30 | 1.40 | 1.50 | 0.70 | 0.70 |
| HDPE (2), g | 10.01 | 10.70 | 10.60 | 11.44 | 12.20 | 12.00 | 12.90 | 13.80 | 12.60 | 13.60 |
| Precipitated Silica (3), g | 28.70 | 30.70 | 26.70 | 28.70 | 30.70 | 26.70 | 28.70 | 30.70 | 26.70 | 28.70 |
| Antioxidant (4), g | 0.06 | 0.05 | 0.05 | 0.06 | 0.05 | 0.05 | 0.05 | 0.05 | 0.05 | 0.05 |
| Lubricant (5), g | 0.36 | 0.30 | 0.30 | 0.36 | 0.30 | 0.30 | 0.30 | 0.30 | 0.30 | 0.30 |
| Processing Oil (6), g | 57.0 | 54.0 | 60.0 | 57.0 | 54.0 | 60.0 | 57.0 | 54.0 | 60.0 | 57.0 |
| Relative Proportions | | | | | | | | | | |
| Filler/Matrix Weight Ratio | 2.01 | 2.01 | 2.01 | 2.01 | 2.01 | 2.01 | 2.01 | 2.01 | 2.01 | 2.01 |
| UHMWPE Content of PE (7), wt % | 30.0 | 30.1 | 20.3 | 20.0 | 20.3 | 9.8 | 9.8 | 9.8 | 5.3 | 4.9 |
| Oil Content, wt % | 57 | 54 | 60 | 57 | 54 | 60 | 57 | 54 | 60 | 57 |
| Test Results | | | | | | | | | | |
| Tensile Strength at 1% Elongation, MPa | 0.648 | 0.701 | 0.529 | 0.732 | 0.532 | 0.512 | 0.662 | 0.653 | 0.533 | 0.658 |

| Example | 61 | 62 | 63 | 64 | 65 | 66 | 67 | 68 | 69 | 70 |
|---|---|---|---|---|---|---|---|---|---|---|
| Ingredient | | | | | | | | | | |
| UHMWPE (1), g | 0.80 | 16.00 | 10.30 | 11.20 | 9.60 | 8.00 | 8.60 | 9.20 | 6.40 | 6.90 |
| HDPE (2), g | 14.50 | 0.00 | 4.10 | 4.80 | 6.40 | 8.00 | 8.60 | 9.20 | 9.60 | 10.30 |
| Precipitated Silica (3), g | 30.70 | 24.00 | 21.60 | 24.00 | 24.00 | 24.00 | 25.80 | 27.60 | 24.00 | 25.80 |
| Antioxidant (4), g | 0.05 | 0.05 | 0.07 | 0.05 | 0.05 | 0.05 | 0.06 | 0.05 | 0.05 | 0.06 |
| Lubricant (5), g | 0.30 | 0.30 | 0.43 | 0.30 | 0.30 | 0.30 | 0.36 | 0.30 | 0.30 | 0.36 |
| Processing Oil (6), g | 54.0 | 60.0 | 63.9 | 60.0 | 60.0 | 60.0 | 57.0 | 54.0 | 60.0 | 57.0 |
| Relative Proportions | | | | | | | | | | |
| Filler/Matrix Weight Ratio | 2.01 | 1.50 | 1.50 | 1.50 | 1.50 | 1.50 | 1.50 | 1.50 | 1.50 | 1.50 |
| UHMWPE Content of PE (7), wt % | 5.2 | 100.0 | 71.5 | 70.0 | 60.0 | 50.0 | 50.0 | 50.0 | 40.0 | 40.1 |
| Oil Content, wt % | 54 | 60 | 64 | 60 | 60 | 60 | 57 | 54 | 60 | 57 |
| Test Results | | | | | | | | | | |
| Tensile Strength at 1% Elongation, MPa | 0.601 | (9) | 0.351 | 0.459 | 0.469 | 0.633 | 0.762 | 0.628 | 0.633 | 0.759 |

| Example | 71 | 72 | 73 | 74 | 75 | 76 | 77 | 78 | 79 | 80 |
|---|---|---|---|---|---|---|---|---|---|---|
| Ingredient | | | | | | | | | | |
| UHMWPE (1), g | 7.40 | 4.80 | 5.20 | 5.50 | 3.20 | 3.40 | 3.70 | 1.60 | 1.70 | 1.80 |
| HDPE (2), g | 11.00 | 11.20 | 12.00 | 12.90 | 12.80 | 13.80 | 14.70 | 14.40 | 15.50 | 16.60 |
| Precipitated Silica (3), g | 27.60 | 24.00 | 25.80 | 27.60 | 24.00 | 25.80 | 27.60 | 24.00 | 25.80 | 27.60 |
| Antioxidant (4), g | 0.05 | 0.05 | 0.06 | 0.05 | 0.05 | 0.06 | 0.05 | 0.05 | 0.06 | 0.05 |
| Lubricant (5), g | 0.30 | 0.30 | 0.36 | 0.30 | 0.30 | 0.36 | 0.30 | 0.30 | 0.36 | 0.30 |
| Processing Oil (6), g | 54.0 | 60.0 | 57.0 | 54.0 | 60.0 | 57.0 | 54.0 | 60.0 | 57.0 | 54.0 |
| Relative Proportions | | | | | | | | | | |
| Filler/Matrix Weight Ratio | 1.50 | 1.50 | 1.50 | 1.50 | 1.50 | 1.50 | 1.50 | 1.50 | 1.50 | 1.50 |
| UHMWPE Content of PE (7), wt % | 40.2 | 30.0 | 30.2 | 29.9 | 20.0 | 19.8 | 20.1 | 10.0 | 9.9 | 9.8 |
| Oil Content, wt % | 54 | 0 | 57 | 54 | 60 | 57 | 54 | 60 | 57 | 54 |
| Test Results | | | | | | | | | | |
| Tensile Strength at 1% Elongation, MPa | 0.671 | 0.585 | 0.993 | 0.804 | 0.608 | 0.717 | 0.855 | 0.645 | 0.752 | 0.657 |

| Example | 81 | 82 | 83 | 84 | 85 | 86 | 87 | 88 | 89 | 90 |
|---|---|---|---|---|---|---|---|---|---|---|
| Ingredient | | | | | | | | | | |
| UHMWPE (1), g | 0.80 | 0.90 | 0.90 | 0.90 | 14.00 | 12.00 | 10.00 | 10.75 | 11.50 | 8.00 |
| HDPE (2), g | 15.20 | 16.30 | 17.10 | 17.50 | 6.00 | 8.00 | 10.00 | 10.75 | 11.50 | 12.00 |
| Precipitated Silica (3), g | 24.00 | 25.80 | 27.00 | 27.60 | 20.00 | 20.00 | 20.00 | 21.50 | 23.00 | 20.00 |
| Antioxidant (4), g | 0.05 | 0.05 | 0.05 | 0.05 | 0.05 | 0.05 | 0.05 | 0.07 | 0.05 | 0.05 |
| Lubricant (5), g | 0.30 | 0.30 | 0.30 | 0.30 | 0.30 | 0.30 | 0.30 | 0.40 | 0.30 | 0.30 |
| Processing Oil (6), g | 60.0 | 57.0 | 55.0 | 54.0 | 60.0 | 60.0 | 60.0 | 57.0 | 54.0 | 60.0 |
| Relative Proportions | | | | | | | | | | |
| Filler/Matrix Weight Ratio | 1.50 | 1.50 | 1.50 | 1.50 | 1.00 | 1.00 | 1.00 | 1.00 | 1.00 | 1.00 |
| UHMWPE Content of PE (7), wt % | 5.0 | 5.2 | 5.0 | 4.9 | 70.0 | 60.0 | 50.0 | 50.0 | 50.0 | 40.0 |
| Oil Content, wt % | 60 | 57 | 55 | 54 | 60 | 60 | 60 | 57 | 54 | 60 |
| Test Results | | | | | | | | | | |
| Tensile Strength at 1% Elongation, MPa | (8) | 0.685 | 0.747 | 0.798 | 0.470 | 0.437 | 0.490 | 0.814 | 0.527 | 0.525 |

| Example | 91 | 92 | 93 | 94 | 95 | 96 | 97 | 98 | 99 | 100 |
|---|---|---|---|---|---|---|---|---|---|---|
| Ingredient | | | | | | | | | | |
| UHMWPE (1), g | 8.60 | 9.20 | 6.00 | 6.45 | 6.90 | 4.00 | 4.30 | 4.60 | 2.00 | 2.15 |
| HDPE (2), g | 12.90 | 13.80 | 14.00 | 15.05 | 16.10 | 16.00 | 17.20 | 18.40 | 18.00 | 19.35 |
| Precipitated Silica (3), g | 21.50 | 23.00 | 20.00 | 21.50 | 23.00 | 20.00 | 21.50 | 23.00 | 20.00 | 21.50 |
| Antioxidant (4), g | 0.07 | 0.05 | 0.05 | 0.07 | 0.05 | 0.05 | 0.07 | 0.05 | 0.05 | 0.07 |
| Lubricant (5), g | 0.40 | 0.30 | 0.30 | 0.40 | 0.30 | 0.30 | 0.40 | 0.30 | 0.30 | 0.40 |
| Processing Oil (6), g | 57.0 | 54.0 | 60.0 | 57.0 | 54.0 | 60.0 | 57.0 | 54.0 | 60.0 | 57.0 |
| Relative Proportions | | | | | | | | | | |
| Filler/Matrix Weight Ratio | 1.00 | 1.00 | 1.00 | 1.00 | 1.00 | 1.00 | 1.00 | 1.00 | 1.00 | 1.00 |

TABLE 2-continued

Formulations and Test Results

| | | | | | | | | | | |
|---|---|---|---|---|---|---|---|---|---|---|
| UHMWPE Content of PE (7), wt % | 40.0 | 40.0 | 30.0 | 30.0 | 30.0 | 20.0 | 20.0 | 20.0 | 10.0 | 10.0 |
| Oil Content, wt % | 57 | 54 | 60 | 57 | 54 | 60 | 57 | 54 | 60 | 57 |
| Test Results | | | | | | | | | | |
| Tensile Strength at 1% Elongation, MPa | 0.895 | 0.565 | 0.601 | 0.837 | 0.600 | 0.616 | 0.838 | 0.904 | 0.626 | 0.810 |
| Example | 101 | 102 | 103 | 104 | 105 | 106 | 107 | 108 | 109 | 110 |
| Ingredient | | | | | | | | | | |
| UHMWPE (1), g | 2.30 | 1.10 | 1.10 | 1.20 | 17.60 | 8.30 | 5.50 | 2.80 | 1.40 | 1.50 |
| HDPE (2), g | 20.70 | 20.40 | 21.40 | 21.80 | 7.00 | 19.30 | 22.10 | 24.80 | 26.20 | 28.40 |
| Precipitated Silica (3), g | 23.00 | 21.50 | 22.50 | 23.00 | 16.40 | 18.40 | 18.40 | 18.40 | 18.40 | 15.00 |
| Antioxidant (4), g | 0.05 | 0.05 | 0.05 | 0.05 | 0.05 | 0.05 | 0.05 | 0.05 | 0.05 | 0.05 |
| Lubricant (5), g | 0.30 | 0.30 | 0.30 | 0.30 | 0.30 | 0.30 | 0.30 | 0.30 | 0.30 | 0.30 |
| Processing Oil (6), g | 54.0 | 57.0 | 55.0 | 54.0 | 59.0 | 54.0 | 54.0 | 54.0 | 54.0 | 55.0 |
| Relative Proportions | | | | | | | | | | |
| Filler/Matrix Weight Ratio | 1.00 | 1.00 | 1.00 | 1.00 | 0.67 | 0.67 | 0.67 | 0.67 | 0.67 | 0.50 |
| UHMWPE Content of PE (7), wt % | 10.0 | 5.1 | 4.9 | 5.2 | 71.5 | 30.1 | 19.9 | 10.1 | 5.1 | 5.0 |
| Oil Content, wt % | 54 | 57 | 55 | 54 | 59 | 54 | 54 | 54 | 54 | 55 |
| Test Results | | | | | | | | | | |
| Tensile Strength at 1% Elongation, MPa | 0.925 | 0.795 | 0.807 | 0.876 | 0.713 | 0.882 | 0.863 | 0.949 | 1.057 | 0.864 |

Footnotes:
(1) UHMWPE = Ultrahigh Molecular Weight Polyethylene, Himont 1900, Himont, U.S.A., Inc.; [η] = 26 deciliters/gram.
(2) HDPE = High Density Polyethylene, Hostalen ™ GM 6255, Hoechst Celanese Corp.
(3) HiSil ® SBG, PPG Industries, Inc.
(4) Irganox ® 1010, Ciba-Geigy Corp.
(5) Petrac ® CZ81, Desoto, Inc., Chemical Speciality Division
(6) ARCO-Prime ® 400, Lyondell Chemical Co., Division of Atlantic Richfield Co.
(7) PE = UHMWPE + HDPE.
(8) The sheet sample made from this formulation was too soft and sticky to be removed from the mill in sheet form. Therefore, tensile strength testing could not be performed.
(9) The sheet sample made from this formulation contained flaws such as tears and/or voids that could not be removed during the milling process. It was not possible to cut flaw-free test specimens from the sheet for tensile strength testing.

Figure 2:
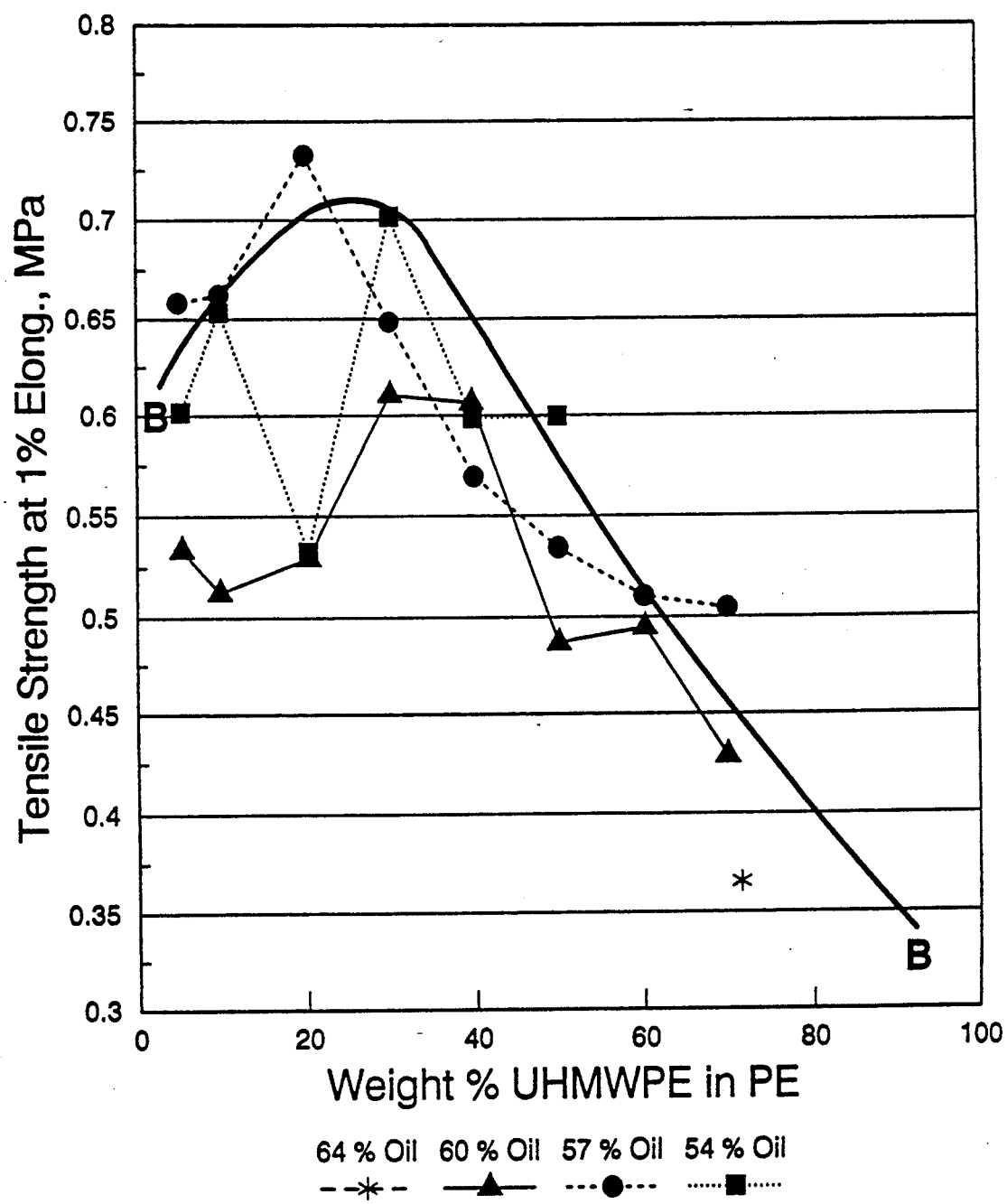
Figure 3:
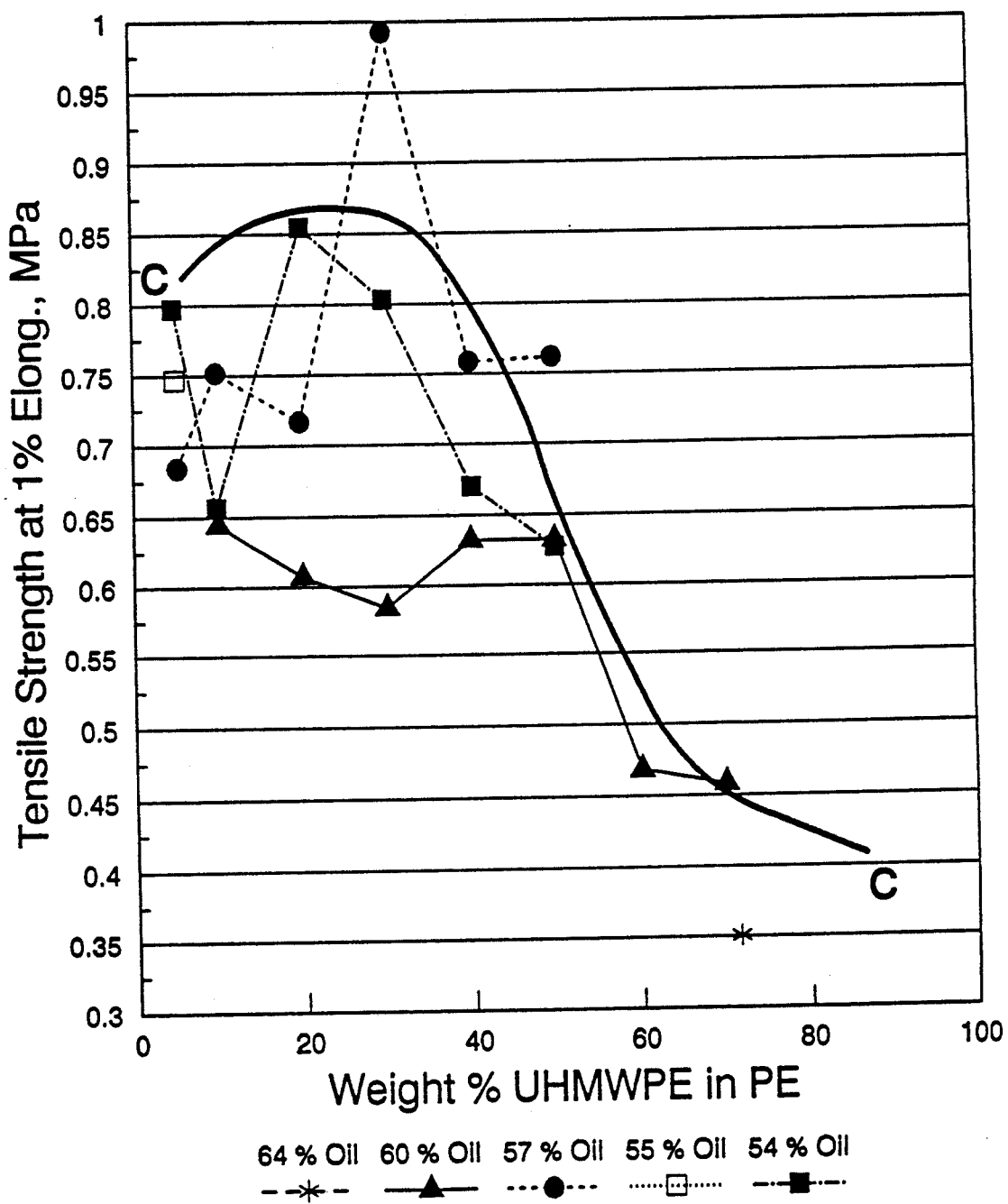
Figure 4:
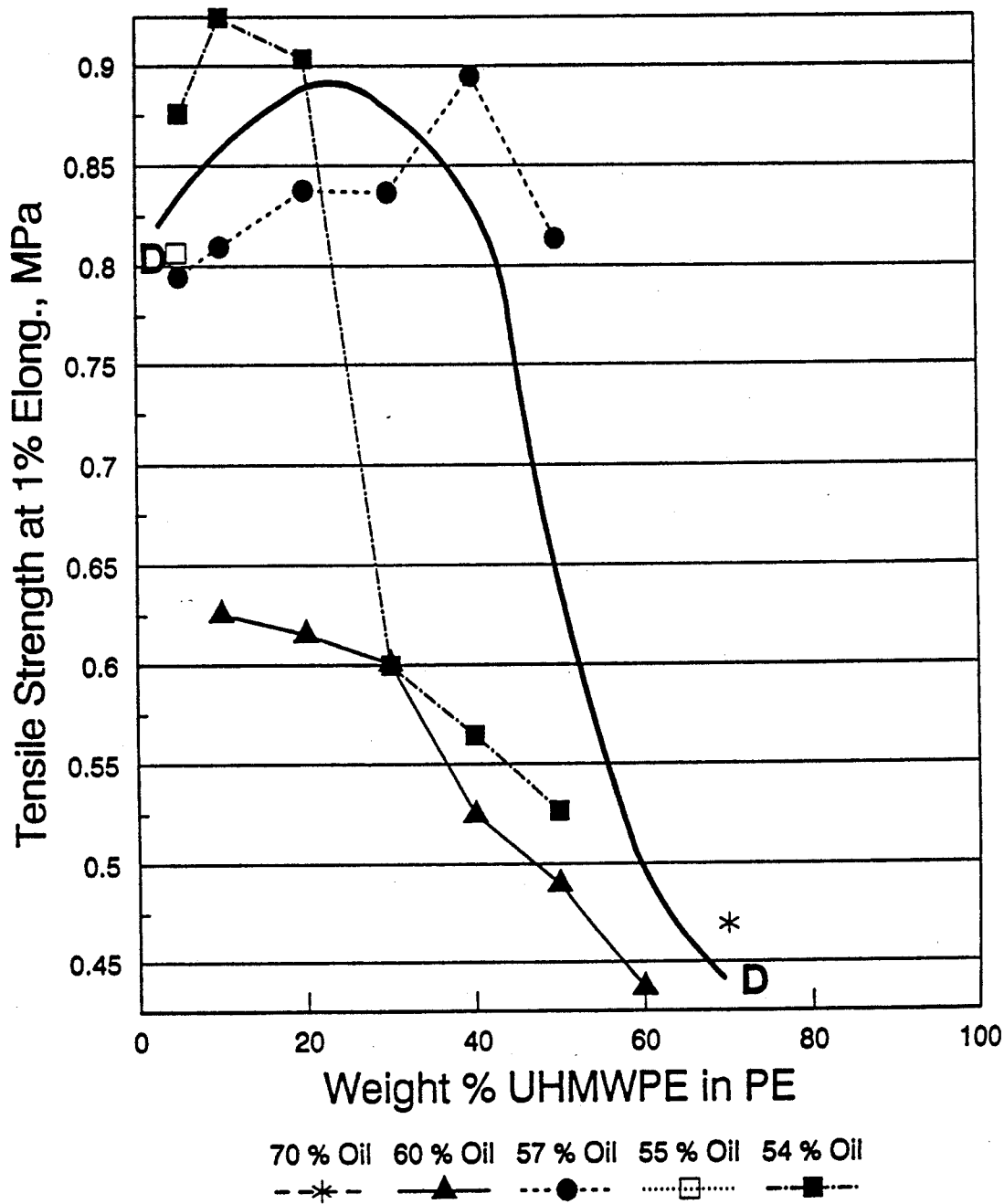
Figure 5:
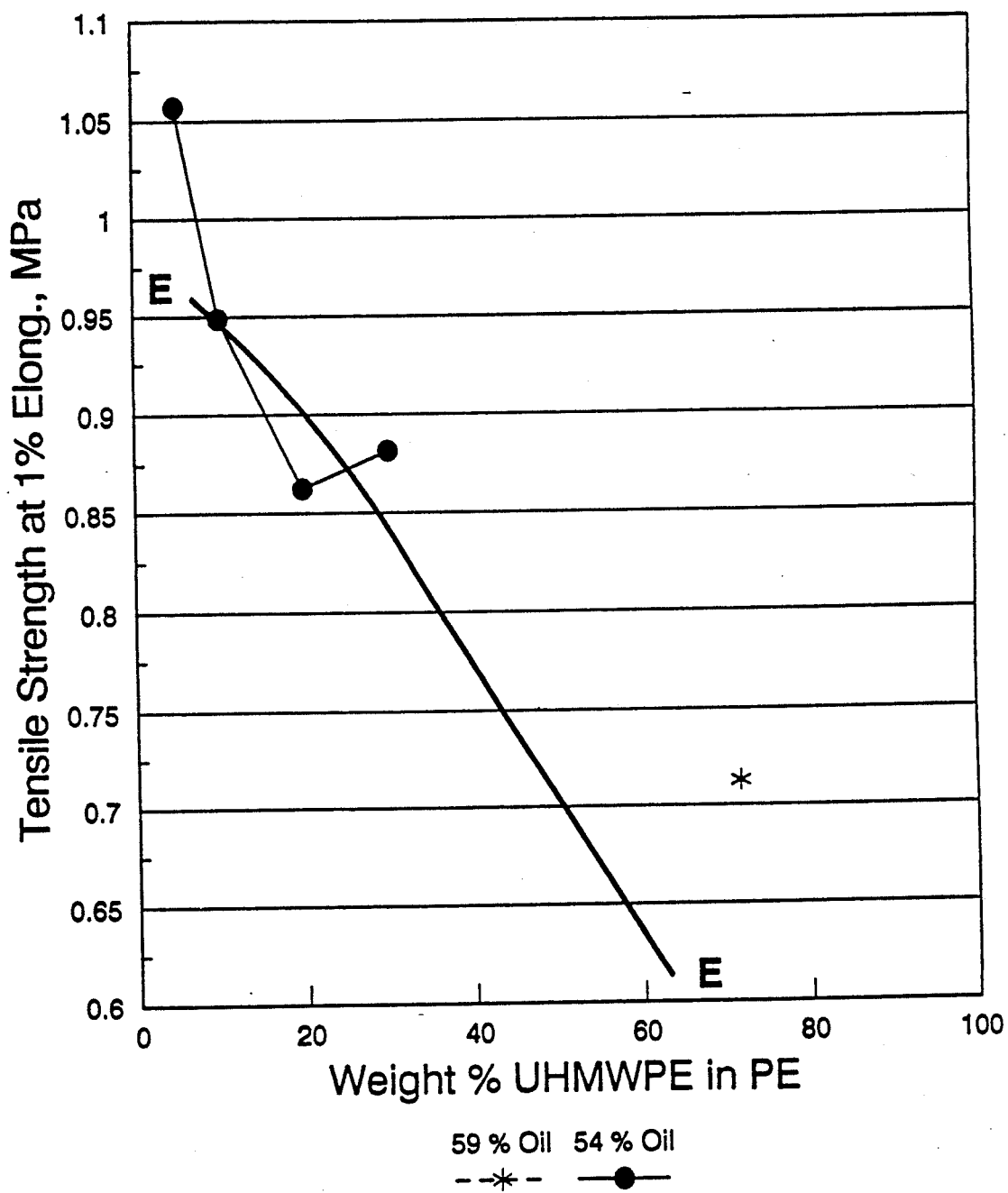

From the data of Examples 1–110, tensile strengths at 1% elongation versus weight percent UHMWPE in the total polyethylene of the matrix for various filler/matrix weight ratios were plotted in FIGS. 1–5. FIG. 1 presents graphically the data at a filler/matrix weight ratio of 2.5/1. FIG. 2 presents graphically the data at a filler/matrix weight ratio of 2.0/1. FIG. 3 presents graphically the data at a filler/matrix weight ratio of 1.5/1. FIG. 4 presents graphically the data at a filler/matrix weight ratio of 1.0/1. FIG. 5 presents graphically the data at a filler/matrix weight ratio of 0.67/1. Data points for samples prepared at the same nominal weight percent oil are connected by lines. In each FIGURE, a lettered curve (A—A, B—B, C—C, D—D, E—E, respectively) has been drawn representing optimum tensile strength at 1% elongation as a function of weight percent UHMWPE in the PE for formulations which can be expected to be prepared over the range of processing oil concentrations and yet be processed and handled by the production equipment described earlier in this specification. These curves were chosen to reflect the best balance of processability in the production equipment described above, sheet surface quality, and tensile strength at 1% elongation. A graphical analysis of these curves was performed to generate the data of Table 3.

TABLE 3

Data from the Lettered Curves of FIGS. 1–5

| Tensile Strength at 1% Elongation, MPa | UHMWPE Content of PE, wt % | Filler/Matrix Weight Ratio |
|---|---|---|
| 0.959 | 7 | 0.67 |
| 0.890 | 22 | 0.67 |
| 0.890 | 23 | 1.00 |
| 0.822 | 3 | 1.00 |
| 0.822 | 6 | 1.50 |
| 0.822 | 33 | 0.67 |
| 0.822 | 38 | 1.50 |
| 0.822 | 40 | 1.00 |
| 0.753 | 43 | 0.67 |
| 0.753 | 44 | 1.50 |
| 0.753 | 45 | 1.00 |
| 0.685 | 14 | 2.00 |
| 0.685 | 35 | 2.00 |
| 0.685 | 48 | 1.00 |
| 0.685 | 49 | 1.50 |
| 0.685 | 54 | 0.67 |
| 0.616 | 3 | 2.00 |
| 0.616 | 44 | 2.00 |
| 0.616 | 52 | 1.00 |
| 0.616 | 53 | 1.50 |
| 0.616 | 63 | 0.67 |
| 0.548 | 35 | 2.50 |
| 0.548 | 53 | 2.00 |
| 0.548 | 56 | 1.00 |
| 0.548 | 58 | 1.50 |
| 0.479 | 50 | 2.50 |
| 0.479 | 62 | 1.00 |
| 0.479 | 63 | 1.50 |
| 0.479 | 67 | 2.00 |
| 0.411 | 56 | 2.50 |
| 0.411 | 79 | 2.00 |
| 0.411 | 86 | 1.50 |
| 0.411 | 87 | 1.00 |
| 0.342 | 63 | 2.50 |
| 0.342 | 92 | 2.00 |
| 0.274 | 78 | 2.50 |

Figure 6:
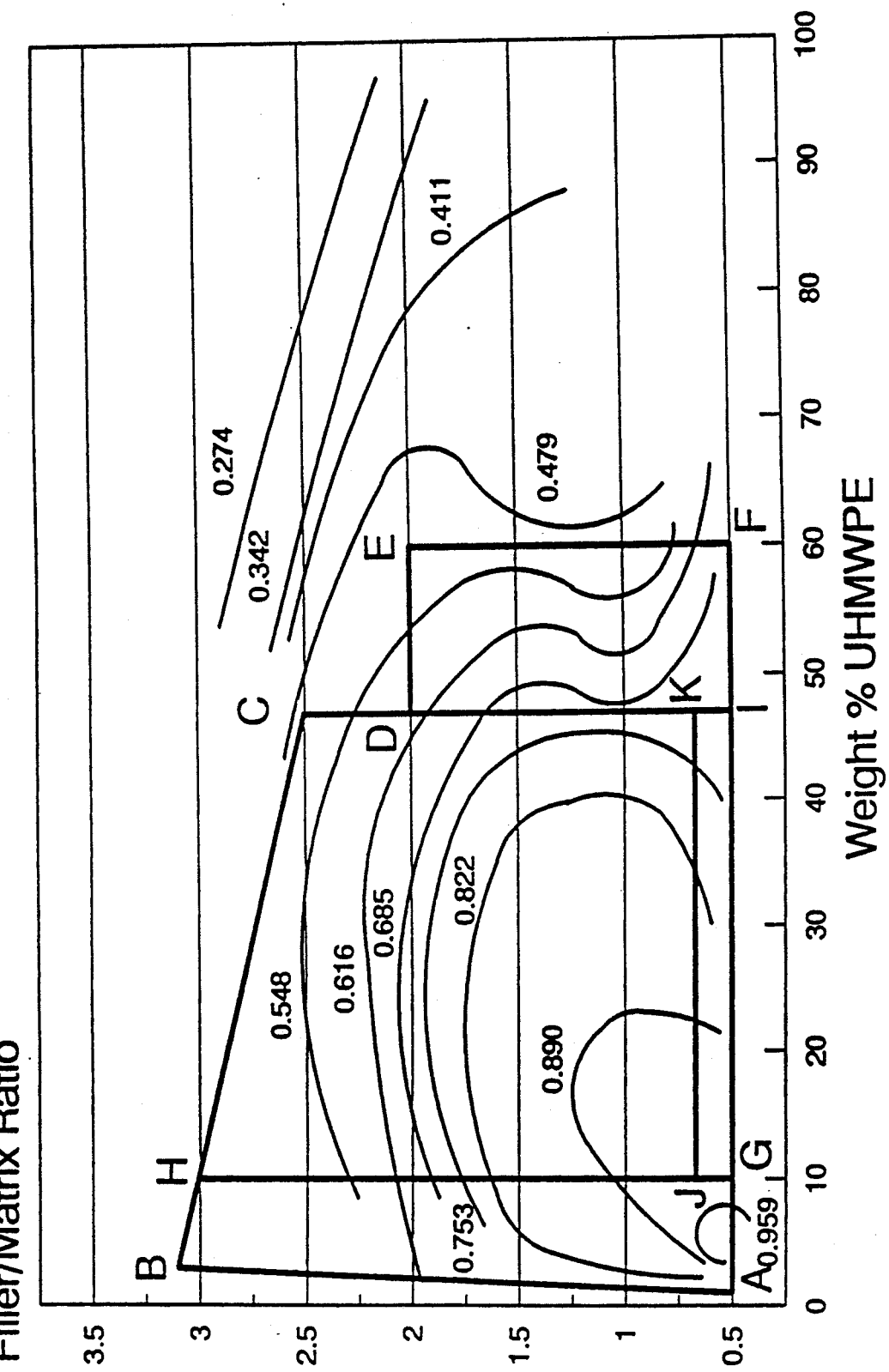
FIG. 6 shows graphically data from Table 3, below.

FIG. 6 presents the data of Table 3 graphically in the form of contours of equal tensile strength at 1% elongation as a function of filler/matrix weight ratio and weight percent UHMWPE in the total polyethylene. The values for the contours of equal tensile strength at 1% elongation are expressed in megapascals. The coordinates of points A–J of FIG. 6 are given in Table 4.

TABLE 4

| Point | Coordinates of Polygon Corners in FIG. 6 | |
|---|---|---|
| | Weight % UHMWPE | Filler/Matrix Weight Ratio |
| A | 1 | 0.5 |
| B | 3 | 3.1 |
| C | 47 | 2.5 |
| D | 47 | 2.0 |
| E | 60 | 2.0 |
| F | 60 | 0.5 |
| G | 10 | 0.5 |
| H | 10 | 3.0 (calculated) |
| I | 47 | 0.5 |
| J | 10 | 0.67 |
| K | 47 | 0.67 |

FIG. 6 shows a general trend in most regions of the graph for tensile strengths at low elongations to increase as the weight percent of UHMWPE in the PE decreases. Other data shown in Table 2, however, indicate that some UHMWPE is necessary in order for the microporous material to be made in production equipment. FIG. 6 also shows a general trend in most regions of the graph for tensile strengths at low elongations to increase as both the weight percent UHMWPE in the PE and the filler/matrix weight ration are decreased.

It is expected that if different materials, such as for example different grades of UHMWPE, LMWPE, filler, processing plasticizer, etc., were used, or if other thermoplastic polymers were added to the UHMWPE and LMWPE, then although the precise numerical values might change, nevertheless the general trends of FIG. 6 would still be observed. Restated, it is believed that the conclusions derived from this work are valid over a wide range of compositions within the teachings of this specification.

Although the present invention has been described with reference to specific details of certain embodiments thereof, it is not intended that such details should be regarded as limitations upon the scope of the invention except insofar as they are included in the accompanying claims.

We claim:
1. In microporous material which on a coating-free, printing ink-free, impregnant-free, and pre-bonding basis comprises:
(a) a matrix comprising a mixture of substantially linear ultrahigh molecular weight polyethylene having an intrinsic viscosity of at least about 10 deciliters/gram and lower molecular weight polyethylene having an ASTM D 1238-86 Condition E melt index of less than about 50 grams/10 minutes and an ASTM D 1238-86 Condition F melt index of at least 0.1 gram/10 minutes;
(b) finely divided substantially water-insoluble filler particles, of which at least about 50 percent by weight are siliceous particles, said filler particles being distributed throughout said matrix; and
(c) a network of interconnecting pores communicating substantially throughout said microporous material, said pores constituting from about 35 to about 80 percent by volume of said microporous material;
the improvement wherein the weight percent of said ultrahigh molecular weight polyethylene in the total polyethylene of said matrix and the filler/matrix weight ratio are within the polygon ABCDEF of FIG. 6 of the drawings.

2. The microporous material of claim 1 wherein the intrinsic viscosity of said ultrahigh molecular weight polyethylene is at least about 18 deciliters/gram.

3. The microporous material of claim 1 wherein the intrinsic viscosity of said ultrahigh molecular weight polyethylene is in the range of from about 18 to about 39 deciliters/gram.

4. The microporous material of claim 1 wherein said lower molecular weight polyethylene is high density polyethylene having a density in the range of from 0.941 to 0.965 grams per cubic centimeter.

5. The microporous material of claim 1 wherein said ultrahigh molecular weight polyethylene and said lower molecular weight polyethylene together constitute at least about 65 percent by weight of the polymer of said matrix.

6. The microporous material of claim 1 wherein said ultrahigh molecular weight polyethylene and said lower molecular weight polyethylene together constitute at least about 85 percent by weight of the polymer of said matrix.

7. The microporous material of claim 1 wherein the ultrahigh molecular weight polyethylene and the lower molecular weight polyethylene together constitute substantially 100 percent by weight of the polymer of said matrix.

8. The microporous material of claim 1 wherein at least about 85 percent by weight of said finely divided substantially water-insoluble filler particles are siliceous.

9. The microporous material of claim 1 wherein substantially all of said finely divided substantially water-insoluble filler particles are siliceous.

10. The microporous material of claim 1 wherein said siliceous particles are silica particles.

11. The microporous material of claim 1 wherein said siliceous particles are precipitated silica particles.

12. The microporous material of claim 11 wherein said precipitated silica particles have an average ultimate particle size of less than about 0.1 micrometer.

13. The microporous material of claim 1 wherein said siliceous particles comprise clay particles.

14. The microporous material of claim 1 wherein said substantially water-insoluble particles comprise titanium oxide particles.

15. The microporous material of claim 1 wherein on a coating-free, printing ink-free, impregnant-free, and pre-bonding basis the volume average diameter of said pores as determined by mercury porosimetry is in the range of from about 0.02 to about 0.5 micrometers.

16. In microporous material which on a coating-free, printing ink-free, impregnant-free, and pre-bonding basis comprises:
(a) a matrix comprising a mixture of substantially linear ultrahigh molecular weight polyethylene having an intrinsic viscosity of at least about 10 deciliters/gram and lower molecular weight polyethylene having an ASTM D 1238-86 Condition E melt index of less than about 50 grams/10 minutes and an ASTM D 1238-86 Condition F melt index of at least 0.1 gram/10 minutes;
(b) finely divided substantially water-insoluble filler particles, of which at least about 50 percent by weight are siliceous particles, said filler particles being distributed throughout said matrix; and (c) a network of interconnecting pores communicating substantially throughout said microporous material, said pores constituting from about 35 to about 80 percent by volume of said microporous material;

the improvement wherein the weight percent of said ultrahigh molecular weight polyethylene in the total polyethylene of said matrix and the filler/matrix weight ratio are within the polygon GHCI of FIG. 6 of the drawings.

17. The microporous material of claim 16 wherein the intrinsic viscosity of said ultrahigh molecular weight polyethylene is at least about 18 deciliters/gram.

18. The microporous material of claim 16 wherein the intrinsic viscosity of said ultrahigh molecular weight polyethylene is in the range of from about 18 to about 39 deciliters/gram.

19. The microporous material of claim 16 wherein said lower molecular weight polyethylene is high density polyethylene having a density in the range of from 0.941 to 0.965 grams per cubic centimeter.

20. The microporous material of claim 16 wherein said ultrahigh molecular weight polyethylene and said lower molecular weight polyethylene together constitute at least about 65 percent by weight of the polymer of said matrix.

21. The microporous material of claim 16 wherein said ultrahigh molecular weight polyethylene and said lower molecular weight polyethylene together constitute at least about 85 percent by weight of the polymer of said matrix.

22. The microporous material of claim 16 wherein the ultrahigh molecular weight polyethylene and the lower molecular weight polyethylene together constitute substantially 100 percent by weight of the polymer of said matrix.

23. The microporous material of claim 16 wherein at least about 85 percent by weight of said finely divided substantially water-insoluble filler particles are siliceous.

24. The microporous material of claim 16 wherein substantially all of said finely divided substantially water-insoluble filler particles are siliceous.

25. The microporous material of claim 16 wherein said siliceous particles are silica particles.

26. The microporous material of claim 16 wherein said siliceous particles are precipitated silica particles.

27. The microporous material of claim 26 wherein said precipitated silica particles have an average ultimate particle size of less than about 0.1 micrometer.

28. The microporous material of claim 16 wherein said siliceous particles comprise clay particles.

29. The microporous material of claim 16 wherein said substantially water-insoluble particles comprise titanium oxide particles.

30. The microporous material of claim 16 wherein on a coating-free, printing ink-free, impregnant-free, and pre-bonding basis the volume average diameter of said pores as determined by mercury porosimetry is in the range of from about 0.02 to about 0.5 micrometers.

31. In microporous material which on a coating-free, printing ink-free, impregnant-free, and pre-bonding basis comprises:

(a) a matrix comprising a mixture of substantially linear ultrahigh molecular weight polyethylene having an intrinsic viscosity of at least about 10 deciliters/gram and lower molecular weight polyethylene having an ASTM D 1238-86 Condition E melt index of less than about 50 grams/10 minutes and an ASTM D 1238-86 Condition F melt index of at least 0.1 gram/10 minutes;

(b) finely divided substantially water-insoluble filler particles, of which at least about 50 percent by weight are siliceous particles, said filler particles being distributed throughout said matrix; and (c) a network of interconnecting pores communicating substantially throughout said microporous material, said pores constituting from about 35 to about 80 percent by volume of said microporous material;

the improvement wherein the weight percent of said ultrahigh molecular weight polyethylene in the total polyethylene of said matrix and the filler/matrix weight ratio are within the polygon JHCK of FIG. 6 of the drawings.

32. The microporous material of claim 31 wherein the intrinsic viscosity of said ultrahigh molecular weight polyethylene is at least about 18 to about 39 deciliters/gram.

33. The microporous material of claim 31 wherein the intrinsic viscosity of said ultrahigh molecular weight polyethylene is in the range of from about 18 to about 39 deciliters/gram.

34. The microporous material of claim 31 wherein said lower molecular weight polyethylene is high density polyethylene having a density in the range of from 0.941 to 0.965 grams per cubic centimeter.

35. The microporous material of claim 31 wherein said ultrahigh molecular weight polyethylene and said lower molecular weight polyethylene together constitute at least about 65 percent by weight of the polymer of said matrix.

36. The microporous material of claim 31 wherein said ultrahigh molecular weight polyethylene and said lower molecular weight polyethylene together constitute at least about 85 percent by weight of the polymer of said matrix.

37. The microporous material of claim 31 wherein the ultrahigh molecular weight polyethylene and the lower molecular weight polyethylene together constitute substantially 100 percent by weight of the polymer of said matrix.

38. The microporous material of claim 31 wherein at least about 85 percent by weight of said finely divided substantially water-insoluble filler particles are siliceous.

39. The microporous material of claim 31 wherein substantially all of said finely divided substantially water-insoluble filler particles are siliceous.

40. The microporous material of claim 31 wherein said siliceous particles are silica particles.

41. The microporous material of claim 31 wherein said siliceous particles are precipitated silica particles.

42. The microporous material of claim 41 wherein said precipitated silica particles have an average ultimate particle size of less than about 0.1 micrometer.

43. The microporous material of claim 31 wherein said siliceous particles comprise clay particles.

44. The microporous material of claim 31 wherein said substantially water-insoluble particles comprise titanium oxide particles.

45. The microporous material of claim 31 wherein on a coating-free, printing ink-free, impregnant-free, and pre-bonding basis the volume average diameter of said pores as determined by mercury porosimetry is in the range of from about 0.02 to about 0.5 micrometers.

* * * * *